United States Patent
Hsu (10) Patent No.: US 10,925,423 B2
(45) Date of Patent: Feb. 23, 2021

(54) THREE-LAYER COMPOSITE PAPER STRAW AND METHOD FOR PRODUCING THE SAME

(71) Applicant: Yu-Ting Hsu, Taipei (TW)

(72) Inventor: Yu-Ting Hsu, Taipei (TW)

( * ) Notice: Subject to any disclaimer, the term of this patent is extended or adjusted under 35 U.S.C. 154(b) by 39 days.

(21) Appl. No.: 16/569,671

(22) Filed: Sep. 13, 2019

(65) Prior Publication Data

US 2020/0000259 A1 Jan. 2, 2020

Related U.S. Application Data

(63) Continuation-in-part of application No. 15/946,769, filed on Apr. 6, 2018, now abandoned.

(51) Int. Cl.
*A47G 21/18* (2006.01)
*B32B 1/08* (2006.01)

(52) U.S. Cl.
CPC ............... *A47G 21/18* (2013.01); *B32B 1/08* (2013.01)

(58) Field of Classification Search
CPC .. A47G 21/18; B32B 1/08; B31C 3/00; B31C 3/04
See application file for complete search history.

(56) References Cited

U.S. PATENT DOCUMENTS

| | | | | |
|---|---|---|---|---|
| 1,944,970 A | * | 1/1934 | Dieffenbach | ........ B31D 5/0095 156/195 |
| 2,035,304 A | * | 3/1936 | Dieffenbach | ....... B29C 66/1122 138/144 |
| 2,035,320 A | * | 3/1936 | Kniesche | .................. B31C 3/00 493/272 |
| 2,084,673 A | * | 6/1937 | Dieffenbach | ........... B29C 66/71 138/144 |
| 2,983,616 A | * | 5/1961 | Levi | .......................... B31C 3/00 426/85 |
| 3,168,982 A | * | 2/1965 | Davis | ..................... A47G 21/18 239/33 |
| 3,270,778 A | * | 9/1966 | Foll | ........................... B31C 3/00 138/144 |

* cited by examiner

*Primary Examiner* — Darren W Gorman
(74) *Attorney, Agent, or Firm* — Chun-Ming Shih; Lanway IPR Services (57) ABSTRACT

A three-layer composite paper straw and a method for producing the same are revealed. Basically the paper straw is made from composite paper with three layers of composite paper spirally wound and adhered in a staggered and overlapping manner. A first layer of paper, a second layer of paper and a third layer of paper of the three layers of composite paper form the outermost layer, the intermediate layer and the inner layer of the paper straw respectively. The first and the third layers of paper are stone paper while the second layer of paper is long fiber pulp paper. The three layers of paper are stacked on top of one another in turn with the long side thereof overlapping like tiles and then adhered to one another. The paper straw is eco-friendly, recyclable, with good structure strength and easy to produce.

8 Claims, 9 Drawing Sheets

THREE-LAYER COMPOSITE PAPER STRAW AND METHOD FOR PRODUCING THE SAME

This application is a Continuation-in-Part of application Ser. No. 15/946,769, filed Apr. 6, 2018.

BACKGROUND OF THE INVENTION

Technical Field

The present invention relates to a paper straw and a method for producing the same, especially to a paper straw made from three layers of composite paper and a method for producing the same.

Description of Related Art

Although people in different countries use different tableware owing to their food culture, they all use straws to drink.

Packaged beverages and handmade drinks are getting popular along with a higher living standard. Thus there is a huge amount of plastic straws used every day all over the world. Most of the straws available now are made from plastic. Although each straw only has a small volume, the overall amount of the straws consumed every day is astonishing. Due to the limited volume, the reuse rate and the value of the plastic straws after recycling are low and are difficult to deal with. The hundreds of billions of the plastic straws used annually not only harm organisms and the environment and pollute the oceans but also take a lot of time to deal with so that high treatment cost is needed.

In order to solve the above problems of the conventional plastic straw, paper straws made from membrane-coated wood-pulp paper are available on the market. The shortcoming of the paper straw is that the wood-pulp paper becomes soft owing to absorption of water in drinks and this leads to poor durability. The paper straws are still unable to completely replace plastic straws and overcome the related problems caused by the plastic straws.

SUMMARY OF THE INVENTION

Therefore it is a primary object of the present invention to provide a three-layer composite paper straw and a method for producing the same. The three-layer composite paper straw is environmentally friendly, completely recyclable, with good structure strength and easy to produce.

In order to achieve the above object, a three-layer composite paper straw according to the present invention is made from three-layer composite paper. A first layer of paper, a second layer of paper and a third layer of paper of the three-layer composite paper are spirally wound and adhered to one another in a staggered and overlapping manner. The first and the third layers of paper are stone paper while the second paper is made from long fiber pulp. The first, the second and the third layers of paper are stacked on top of one another in turn with the long side thereof overlapping like tiles and adhered to one another in a staggered manner with one half of each layer of paper along the long side. The three-layer composite paper is wound spirally and adhered in a staggered and overlapping manner to form the three-layer composite paper straw with three layers of the wall. The first layer of paper forms the outermost layer of the three-layer composite paper straw and the second layer of paper becomes the intermediate layer of the three-layer composite paper straw while the third layer of paper forms the inner layer of the three-layer composite paper straw.

Preferably, the material for the wood-pulp paper used in the second layer of paper is long fiber pulp. The three-layer composite paper straw produced in a spirally wound, staggered and overlapping manner includes three layers of walls, with no cracks and no leakage. The intermediate layer made from long fiber pulp provides sufficient structure strength for supporting the paper straw so that stiffness, convenience of use and deformation resistance of the paper straw are improved. The stone paper on two sides of the intermediate layer provides waterproof and leak proof properties.

Preferably, the long side of the first layer of paper, the long side of the second layer of paper and the long side of the third layer of paper are stacked on top of one another in turn to be overlapping like tiles in the following way. Each of the first layer of paper, the second layer of paper and the third layer of paper includes two surfaces, a first surface and a second surface. Each of the two surfaces of the first layer of paper, the second layer of paper and the third layer of paper is divided in into two halves, lengthwise, including a front half and a back half. A back half of a second surface of the first layer of paper is adhered to a front half of a first surface of the second layer of paper and a back half of a second surface of the second layer of paper is adhered to a front half of a first surface of the third layer of paper. The width of the back half of the second surface of the first layer of paper is one half of the width of the short side of the first layer of paper and the width of the front half of the first surface of the second layer of paper is one half of the width of the short side of the second layer of paper. The width of the back half of the second surface of the second layer of paper is one half of the width of the short side of the second layer of paper and the width of the front half of the first surface of the third layer of paper is one half of the width of the short side of the third layer of paper. The three-layer composite paper is wound spirally and the first, the second and the third layers of paper in a staggered and overlapping manner are adhered to form the three-layer composite paper straw in the following way. After the first coil of the three-layer composite paper has been wound, a front half of a second surface of the first layer of paper is adhered to a back half of a first surface of the second layer of paper and a front half of a second surface of the second layer of paper is adhered to a back half of a first surface of the third layer of paper. The width of the front half of the second surface of the first layer of paper is one half of the width of the short side of the first layer of paper and the width of the back half of the first surface of the second layer of paper is one half of the width of the short side of the second layer of paper. The width of the front half of the second surface of the second layer of paper is one half of the width of the short side of the second layer of paper and the width of the back half of the first surface of the third layer of paper is one half of the width of the short side of the third layer of paper.

A method for producing three-layer composite paper straws includes the following steps.

A. preparing three paper strips with the same width including a first layer of paper, a second layer of paper and a third layer of paper while the first layer of paper and the third layer of paper are stone paper and the second layer of paper is wood pulp paper;

B. stacking the long side of the first layer of paper, the long side of the second layer of paper and the long side of the third layer of paper on top of one another to be overlapping like tiles, and adhering one half of the first layer of paper to one half of the second layer of paper and the other half of the second layer of paper to one half of the third layer of paper to form a three-layer composite paper;

C. winding the three-layer composite paper spirally and attaching the first layer of paper, the second layer of paper and the third layer of paper to one another in a staggered and overlapping manner to form a three-layer composite paper straw with three layers of the wall; the first layer of paper becomes the outermost layer of the three-layer composite paper straw and the second layer of paper is the intermediate layer of the three-layer composite paper straw while the third layer of paper forms the inner layer of the three-layer composite paper straw.

Preferably, the contact surfaces among the first layer of paper, the second layer of paper and the third layer of paper are attached and connected by one of the following ways: using adhesives, heat pressing and ultrasonic welding.

The three-layer composite paper straw of the present invention is eco-friendly, completely recyclable, with good structure strength and easy to produce. The three-layer composite paper straw produced in a spirally wound, staggered and overlapping manner has three layers of the wall, with no cracks and no leakage. The intermediate layer made from long fiber pulp provides sufficient structure strength so that stiffness, convenience of use and deformation resistance of the paper straw are improved while the stone paper on two sides of the intermediate layer provides waterproof and leak proof properties.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
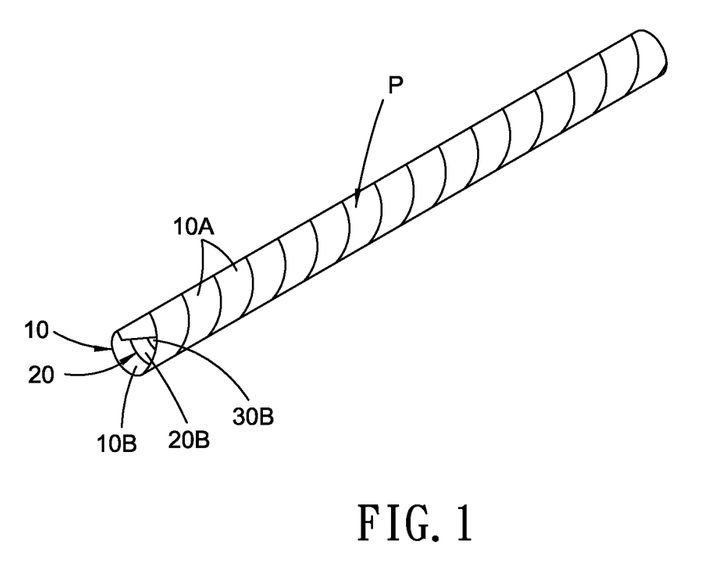
FIG. 1 is a perspective view of an embodiment of a three-layer composite paper straw according to the present invention.
Figure 2A:
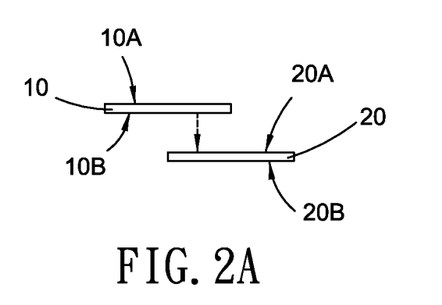
FIG. 2A-2D are schematic drawings showing a production processes of three-layer composite paper of an embodiment according to the present invention.
Figure 2B:
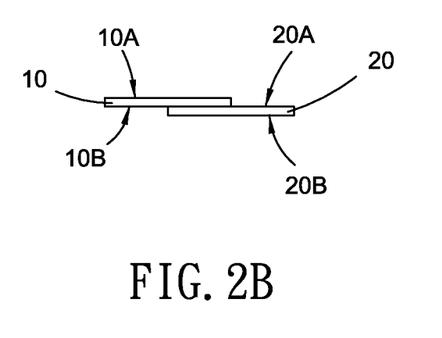
Figure 2C:
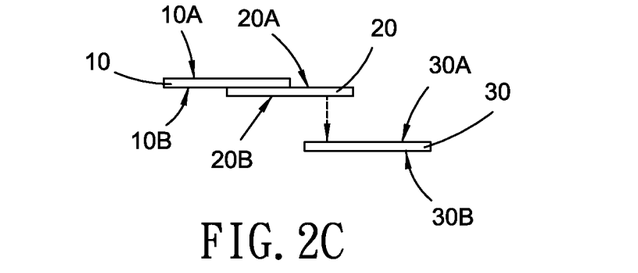
Figure 2D:
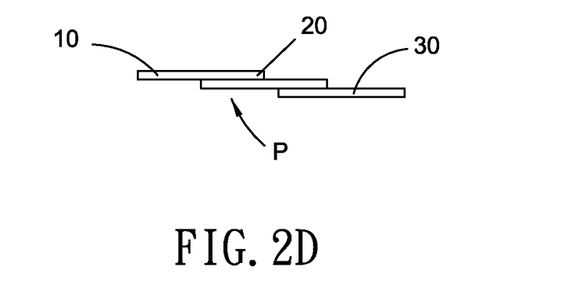

Refer to FIG. 1, a perspective view of an embodiment of a three-layer composite paper straw is revealed.

Figure 3:
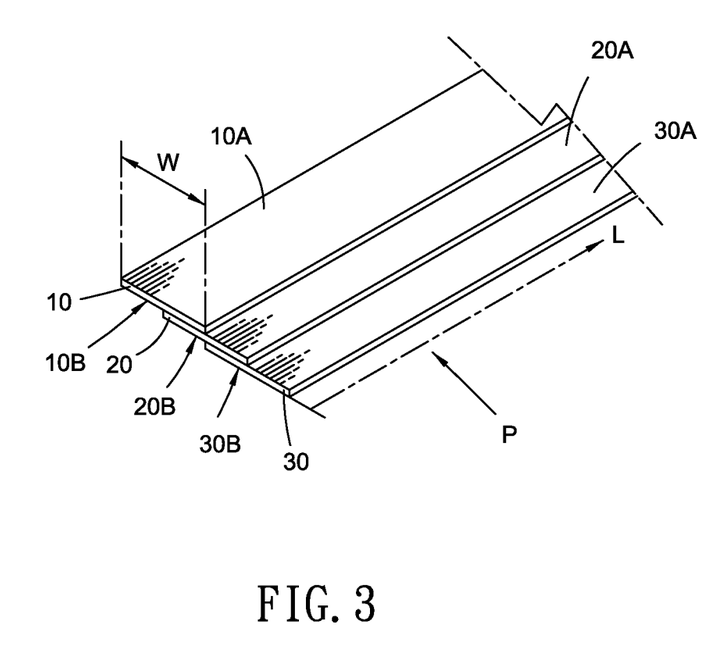
FIG. 3 is a schematic drawing showing structure of an embodiment according to the present invention.
Figure 5:
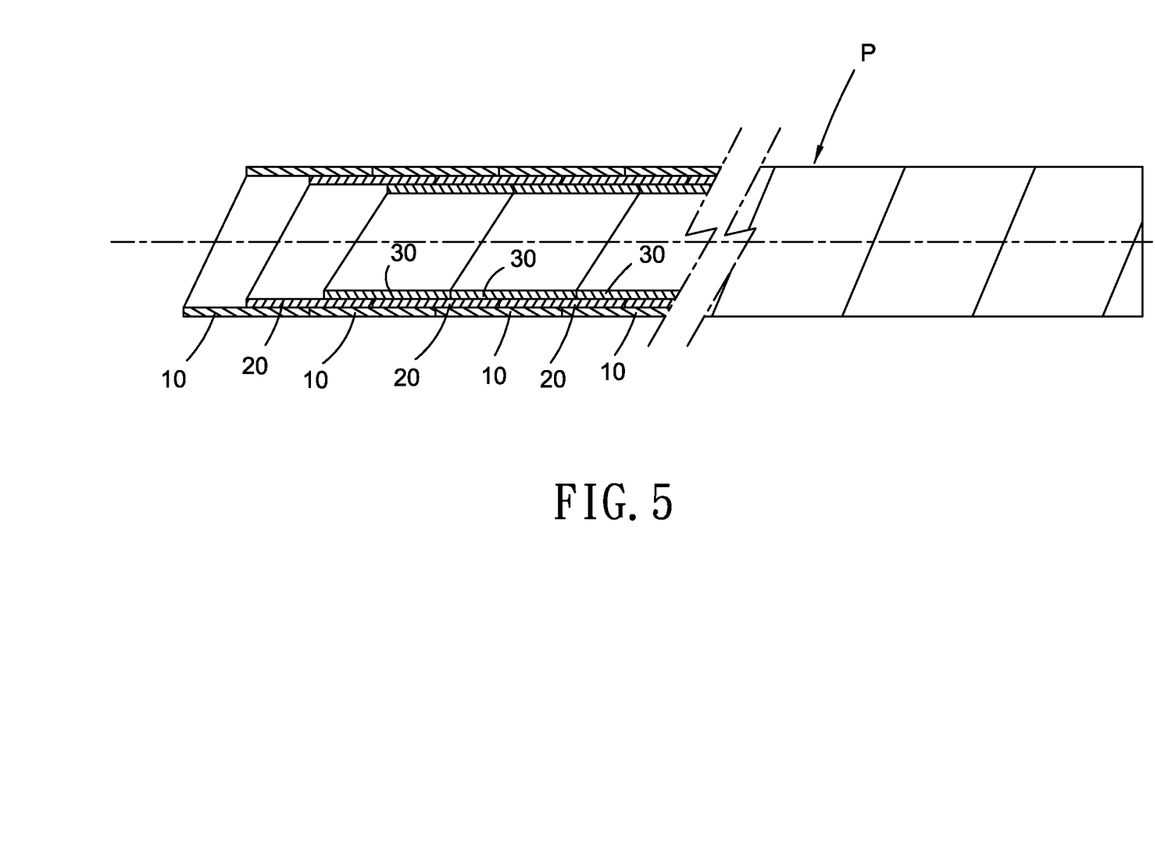
FIG. 5 is a sectional view of an embodiment according to the present invention.

The three-layer composite paper straw is basically produced by a kind of three-layer composite paper P formed by three layers of composite paper spirally wound and arranged in a staggered and overlapping manner. The three-layer composite paper P includes a first layer of paper 10, a second layer of paper 20, and a third layer of paper 30. The first layer of paper 10, the second layer of paper 20 and the third layer of paper 30 are all paper strips with the same width. The first layer of paper 10 and the third layer of paper 30 are made from stone material/rich mineral while the second layer of paper 20 is made from wood pulp, preferably long fiber pulp. As shown in FIG. 3, the first layer of paper 10, the second layer of paper 20 and the third layer of paper 30 are stacked on top of one another in turn with the long side L thereof overlapping like tiles. The first layer of paper 10, the second layer of paper 20, and the third layer of paper 30 are adhered to one another in a staggered manner. The short side of the first layer of paper 10 is with the length W. One half of the first layer of paper 10 is adhered to one half of the second layer of paper 20 and the other half of the second layer of paper 20 is adhered to one half of the third layer of paper 30. In order to wind the paper strips continuously for mass production, the length of the first layer of paper 10, the length of the second layer of paper 20 and the length of the third layer of paper 30 are not limited. In a preferred embodiment, a plurality of rolls of paper strips is used as material. The three-layer composite paper P is wound spirally while the first layer of paper 10, the second layer of paper 20 and the third layer of paper 30 are adhered in a staggered and overlapping manner to form a three-layer composite paper straw with three layers of walls, as shown in FIG. 5. The first layer of paper 10 forms the outermost layer of the three-layer composite paper straw and the second layer of paper 20 becomes the intermediate layer of the three-layer composite paper straw while the third layer of paper 30 forms the innermost layer of the three-layer composite paper straw.

The first layer of paper 10, the second layer of paper 20 and the third layer of paper 30 all include a first surface and a second surface opposite to each other. For convenience of explanation, the letter A after each reference numeral is used to denote the first surface of the layer of the paper the reference numeral denotes and the letter B represents the second surface. For example, 10A denotes the first surface of the first layer of paper 10, 20B represents the second surface of the second layer of paper 20, and so on. After the three-layer composite paper P being produced into the three-layer composite paper straw, all the first surfaces 10A, 20A, and 30A are facing the outer surface of the three-layer composite paper straw and all the second surfaces 10B, 20B, and 30B are facing the inner surface of the three-layer composite paper straw.

Figure 6:
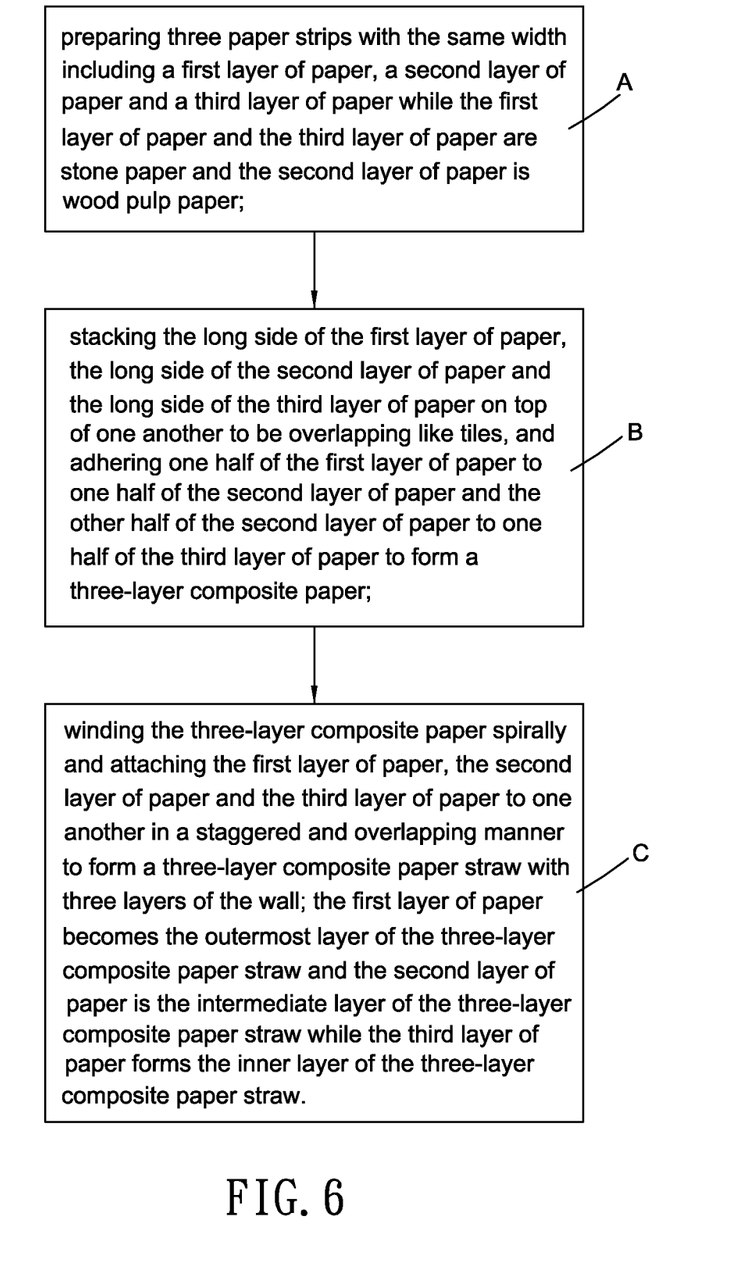
FIG. 6 is a flow chart showing steps of a method for producing three-layer composite paper straws according to the present invention.

Refer to FIG. 6, a flow chart showing steps of a method for producing three-layer composite paper straws of the present invention is disclosed. The method includes the following steps.

A. preparing three paper strips with the same width including a first layer of paper 10, a second layer of paper 20 and a third layer of paper 30 while the first layer of paper 10 and the third layer of paper 30 are stone paper and the second layer of paper is wood pulp paper;

B. stacking the long side of the first layer of paper 10, the long side of the second layer of paper 20 and the long side of the third layer of paper 30 on top of one another to be overlapping like tiles, and adhering one half of the first layer of paper 10 to one half of the second layer of paper 20 and the other half of the second layer of paper 20 to one half of the third layer of paper 30 to form a three-layer composite paper;

C. winding the three-layer composite paper P spirally and adhering the first layer of paper 10, the second layer of paper 20 and the third layer of paper 30 to one another in a staggered and overlapping manner to form a three-layer composite paper straw with three layers of the wall. The first layer of paper 10 becomes the outermost layer of the three-layer composite paper straw and the second layer of paper 20 is the intermediate layer of the three-layer composite paper straw while the third layer of paper 30 forms the innermost layer of the three-layer composite paper straw.

Refer to FIG. 2A-2D, how the first layer of paper 10, the second layer of paper 20 and the third layer of paper 30 are stacked on top of one another in turn with their long side L overlapping like tiles is revealed. Each surface is divided into two halves, lengthwise to get a front half and a back half. First a back half of the second surface 10B of the first layer of paper 10 is adhered to a front half of the first surface 20A of the second layer of paper 20. As shown in the figures, the width of the back half of the second surface 10B is one half of the width W of the short side of the first layer of paper 10. The width of the front half of the first surface 20A is one half of the width W of the short side of the second layer of paper 20. Similarly, a back half of the second surface 20B of the second layer of paper 20 is adhered to a front half of the first surface 30A of the third layer of paper 30. The width of the back half of the second surface 20B is one half of the width W of the short side of the second layer of paper 20 and the width W of the front half of the first surface 30A is one half of the width W of the short side of the third layer of paper 30.

In a preferred embodiment, the contact surfaces among the first layer of paper 10, the second layer of paper 20 and the third layer of paper 30 are connected by one of the following ways: using adhesives, heat pressing and ultrasonic welding. The stone paper is basically made from 80% calcium carbonate (CaCO3) and 20% environmentally friendly high density polyethylene (HDPE). Owing to the polyethylene contained therein, the contact surfaces between the first layer of paper 10, the second layer of paper 20 and the third layer of paper 30 can be adhered firmly by ultrasonic welding or heat welding.

Figure 4:
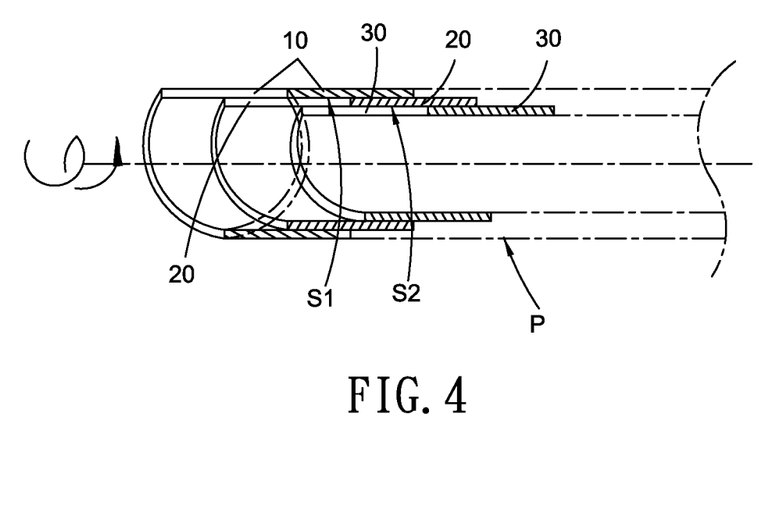
FIG. 4 is a schematic drawing showing a three-layer composite paper straw produced in a spirally wound, staggered and overlapping manner according to the present invention.

Refer to FIG. 4, the three-layer composite paper P is spirally wound and the three layers of paper 10, 20 and 30 are staggered and overlapping on top of one another in turn to form the three-layer composite paper straw. After the first coil of the three-layer composite paper P has been wound, a front half of the second surface 10B of the first layer of paper 10 is adhered to a back half of the first surface 20 A of the second layer of paper 20, as shown in the area the reference letter S1 indicates. The width of the front half of the second surface 10B is one half of the width W of the short side of the first layer of paper 10. The width of the back half of the first surface 20A is one half of the width W of the short side of the second layer of paper 20. A front half of the second surface 20B of the second layer of paper 20 is adhered to a back half of the first surface 30A of the third layer of paper 30, as shown in the area the reference letter S2 indicates. The width of the front half of the second surface 20B is one half of the width W of the short side of the second layer of paper 20 and the width of the back half of the first surface 30A is one half of the width W of the short side of the third layer of paper 30. In the three-layer composite paper straw formed by spiral winding and staggered overlapping, the first layer of paper 10 becomes the outermost layer of the three-layer composite paper straw and the second layer of paper 20 is the intermediate layer of the three-layer composite paper straw while the third layer of paper 30 forms the innermost layer of the three-layer composite paper straw, as shown in FIG. 5.

Figure 7:
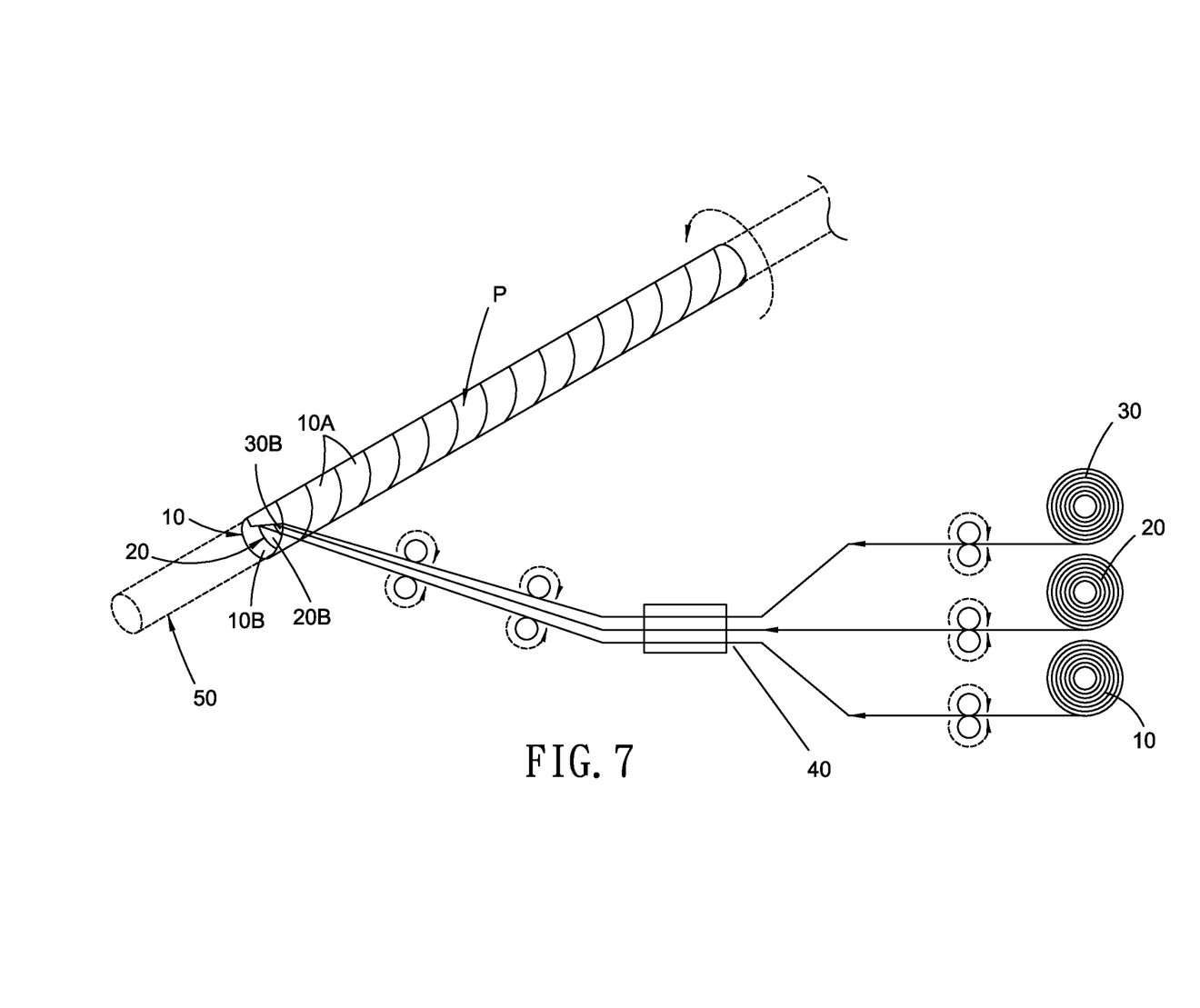
FIG. 7 is a schematic drawing showing equipment used for producing an embodiment according to the present invention.

Refer to FIG. 7, a schematic drawing showing equipment for producing three-layer composite paper straws is revealed. In the embodiment, the first layer of paper 10, the second layer of paper 20, and the third layer of paper 30, all with the same width W, are wound into rolls as raw material for producing the three-layer composite paper straws. The first layer of paper 10, the second layer of paper 20, and the third layer of paper 30 are passed through an adhesive coating unit 40 and coated with a layer of food grade adhesive on the surfaces in contact with one another. Then the first layer of paper 10, the second layer of paper 20, and the third layer of paper 30 are guided to a winding device 50 for being adhered and connected to one another by the adhesive to form the three-layer composite paper P. Lastly three-layer composite paper straws with three layers of the wall produced continuously by spiral winding and staggered overlapping of the three-layer composite paper P.

Figure 8:
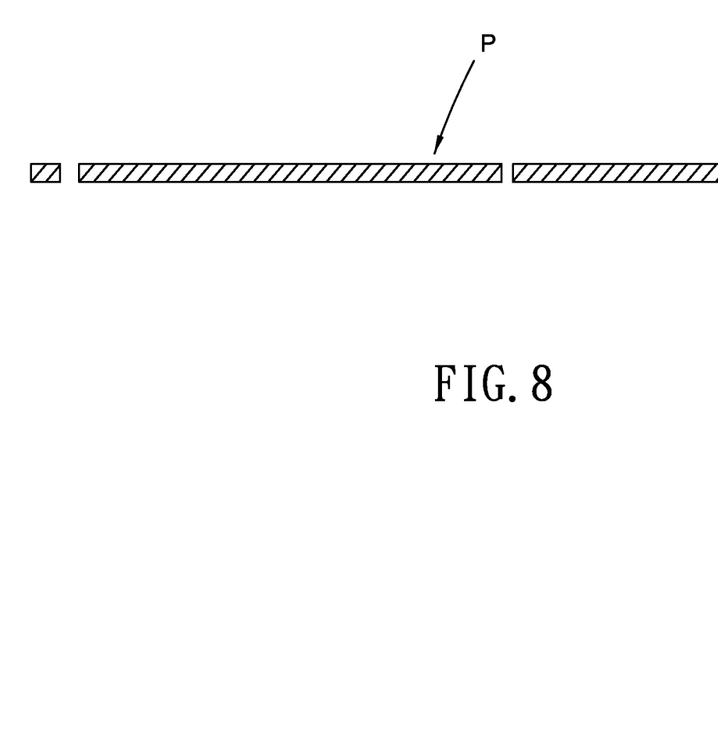
FIG. 8 is a schematic drawing showing a method for continuous production of an embodiment according to the present invention.

Refer to FIG. 8, a tube is produced continuously by spiral winding and staggered overlapping of the three-layer composite paper P and then is cut at the preset length of the straw. Thus mass production of the three-layer composite paper straws is achieved. A segment of the tube initially wound and manufactured is cut and removed because the three layers of the wall are not complete.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A three-layer composite paper straw made of three-layer composite paper with three layers of composite paper spirally wound and adhered in a staggered and overlapping manner comprising:
   a first layer of paper which is stone paper;
   a second layer of paper which is wood pulp paper; and
   a third layer of paper which is stone paper;
   wherein the first layer of paper, the second layer of paper and the third layer of paper are paper strips with the same width; wherein the long side of the first layer of paper, the long side of the second layer of paper and the long side of the third layer of paper are stacked on top of one another in turn and overlapping like tiles while one half of the first layer of paper is adhered to one half of the second layer of paper and the other half of the second layer of paper is adhered to one half of the third layer of paper so as form the three-layer composite paper; wherein the three-layer composite paper is spirally wound and adhered in a staggered and overlapping manner to form the three-layer composite paper straw with three layers of the wall; the first layer of paper forms the outermost layer of the three-layer composite paper straw and the second layer of paper becomes the intermediate layer of the three-layer composite paper straw while the third layer of paper forms the inner layer of the three-layer composite paper straw.

2. The three-layer composite paper straw as claimed in claim 1, wherein contact surfaces among the first layer of paper, the second layer of paper and the third layer of paper are attached by one way selected from the group consisting of using adhesives, heat pressing and ultrasonic welding.

3. The three-layer composite paper straw as claimed in claim 1, wherein the second layer of paper is made from long fiber pulp.

4. The three-layer composite paper straw as claimed in claim 1, wherein each of the first layer of paper, the second layer of paper and the third layer of paper includes two surfaces, a first surface and a second surface; each of the two surfaces of the first layer of paper, the second layer of paper and the third layer of paper is divided into two halves, lengthwise, including a front half and a back half; wherein in order to stack the long side of the first layer of paper, the long side of the second layer of paper and the long side of the third layer of paper on top of one another in turn to be overlapping like tiles, a back half of a second surface of the first layer of paper is adhered to a front half of a first surface of the second layer of paper and a back half of a second surface of the second layer of paper is adhered to a front half of a first surface of the third layer of paper; the width of the back half of the second surface of the first layer of paper is one half of the width of the short side of the first layer of paper and the width of the front half of the first surface of the second layer of paper is one half of the width of the short side of the second layer of paper; the width of the back half of the second surface of the second layer of paper is one half of the width of the short side of the second layer of paper and the width of the front half of the first surface of the third layer of paper is one half of the width of the short side of the third layer of paper; wherein in order to wind the three-layer composite paper spirally and attach the first, the second and the third layers of paper in a staggered and overlapping manner to form the three-layer composite paper straw, after the first coil of the three-layer composite paper has been wound, a front half of a second surface of the first layer of paper is adhered to a back half of a first surface of the second layer of paper and a front half of a second surface of the second layer of paper is adhered to a back half of a first surface of the third layer of paper; the width of the front half of the second surface of the first layer of paper is one half of the width of the short side of the first layer of paper and the width of the back half of the first surface of the second layer of paper is one half of the width of the short side of the second layer of paper; the width of the front half of the second surface of the second layer of paper is one half of the width of the short side of the second layer of paper and the width of the back half of the first surface of the third layer of paper is one half of the width of the short side of the third layer of paper.

5. A method for producing three-layer composite paper straws comprising the steps of:
  A. preparing three paper strips with the same width including a first layer of paper, a second layer of paper and a third layer of paper while the first layer of paper and the third layer of paper are stone paper and the second layer of paper is wood pulp paper;
  B. stacking the long side of the first layer of paper, the long side of the second layer of paper and the long side of the third layer of paper on top of one another to be overlapping like tiles, and adhering one half of the first layer of paper to one half of the second layer of paper and the other half of the second layer of paper to one half of the third layer of paper to form a three-layer composite paper;
  C. winding the three-layer composite paper spirally and attaching the first layer of paper, the second layer of paper and the third layer of paper to one another in a staggered and overlapping manner to form a three-layer composite paper straw with three layers of the wall; the first layer of paper becomes the outermost layer of the three-layer composite paper straw and the second layer of paper is the intermediate layer of the three-layer composite paper straw while the third layer of paper forms the inner layer of the three-layer composite paper straw.

6. The method for producing three-layer composite paper straws as claimed in claim 5, wherein contact surfaces among the first layer of paper, the second layer of paper and the third layer of paper are attached by one way selected from the group consisting of using adhesives, heat pressing and ultrasonic welding.

7. The method for producing three-layer composite paper straws as claimed in claim 5, wherein the second layer of paper is made from long fiber pulp.

8. The method for producing three-layer composite paper straws as claimed in claim 5, wherein each of the first layer of paper, the second layer of paper and the third layer of paper includes two surfaces, a first surface and a second surface; each of the two surfaces of the first layer of paper, the second layer of paper and the third layer of paper is divided into two halves, lengthwise, including a front half and a back half; wherein in order to stack the long side of the first layer of paper, the long side of the second layer of paper and the long side of the third layer of paper on top of one another in turn to be overlapping like tiles, a back half of a second surface of the first layer of paper is adhered to a front half of a first surface of the second layer of paper and a back half of a second surface of the second layer of paper is adhered to a front half of a first surface of the third layer of paper; the width of the back half of the second surface of the first layer of paper is one half of the width of the short side of the first layer of paper and the width of the front half of the first surface of the second layer of paper is one half of the width of the short side of the second layer of paper; the width of the back half of the second surface of the second layer of paper is one half of the width of the short side of the second layer of paper and the width of the front half of the first surface of the third layer of paper is one half of the width of the short side of the third layer of paper; wherein in order to wind the three-layer composite paper spirally and attach the first, the second and the third layers of paper in a staggered and overlapping manner to form the three-layer composite paper straw, after the first coil of the three-layer composite paper has been wound, a front half of a second surface of the first layer of paper is adhered to a back half of a first surface of the second layer of paper and a front half of a second surface of the second layer of paper is adhered to a back half of a first surface of the third layer of paper; the width of the front half of the second surface of the first layer of paper is one half of the width of the short side of the first layer of paper and the width of the back half of the first surface of the second layer of paper is one half of the width of the short side of the second layer of paper; the width of the front half of the second surface of the second layer of paper is one half of the width of the short side of the second layer of paper and the width of the back half of the first surface of the third layer of paper is one half of the width of the short side of the third layer of paper.

* * * * *